United States Patent [19]

Quanbeck

[11] 4,054,177
[45] Oct. 18, 1977

[54] TRIP BEAM LINKAGE

[76] Inventor: Sherman H. Quanbeck, Aneta, N. Dak. 58212

[21] Appl. No.: 606,726

[22] Filed: Aug. 21, 1975

[51] Int. Cl.$^2$ ............................................. A01B 61/00
[52] U.S. Cl. .................................... 172/267; 172/268; 172/773
[58] Field of Search ............... 172/266, 267, 268, 265, 172/269, 270, 271

[56] References Cited

U.S. PATENT DOCUMENTS

| 422,543 | 3/1890 | Sattley | 172/267 |
| 668,717 | 2/1901 | Rowell et al. | 172/267 |
| 839,956 | 1/1907 | Reeves et al. | 172/266 |
| 1,319,489 | 10/1919 | Robinson | 172/268 |
| 2,944,613 | 7/1960 | Anderson | 172/266 |
| 3,084,749 | 4/1963 | Anderson | 172/268 |
| 3,321,027 | 5/1967 | Johnson et al. | 172/266 |

Primary Examiner—George J. Marlo
Attorney, Agent, or Firm—Dugger, Johnson & Westman

[57] ABSTRACT

A trip beam linkage for moldboard plow or other earth working tools which trips to clear obstacles such as rocks and the like and uses a sturdy, compact and reliable folding tripping linkage which permits reliable, high clearance tripping using tension springs. The linkage lengths are selected to permit reliance on a high spring force for initial holding, which is more reliable than over center or near center trip linkages. The folding linkage is positioned so spring expansion is kept to a minimum during tripping. The linkage can be adjusted to permit aligning the earth working tool. The working position of the linkage is determined by an adjustable stop.

15 Claims, 4 Drawing Figures

TRIP BEAM LINKAGE

BACKGROUND OF THE INVENTION

1. Field of the Invention

The present invention relates to trip mechanisms for earth working tools such as moldboard plows.

2. Prior Art

A wide variety of trip beam plows have been used in the prior art. My U.S. Pat. No. 3,550,690 illustrates one type of trip beam linkage. In addition, early patents show various pivoting lever trip linkages, for example, Australian Pat. No. 107,929, and U.S. Pat. No. 837,335. Devices using slide members tend to wear because of the high loads involved. A trip beam which operates from a single pivot axis is desired because of simplicity, but the device must provide a high clearance tripping action without overstressing any parts.

A pivoting linkage utilizing a single pivot for the earth working tool and compression springs for automatic reset has been made and sold by others. Such a device requires large compression springs, and is not capable of providing the desired tripping clearance, or holding and reset force. Also, costs are high, particularly the cost of the heavy compression springs used.

It has long been recognized that the use of tension springs for controlling loads is desirable, but again, when using the type of folding linkages mentioned, tension springs have heretofore not been used because of problems with trip geometry, space considerations and similar factors.

SUMMARY OF THE INVENTION

The present invention relates to a folding linkage trip beam for implements. The trip beam is mounted in relation to the folding linkage so that it will be held in working position under spring pressure, and when tripped will pivot upwardly to clear obstructions under a decreasing spring pressure. The unit utilizes tension springs for reliability of action, fewer wearing parts, and to permit sufficient pivoting action so that a substantially higher clearance is obtained than in conventional folding linkage trip beams.

The spring pivot points are located in relation to the pivot of the trip beam, and the pivots of the folding linkage so that the spring expansion is kept to a minimum and so that the spring does not go "over center" to any substantial degree when the beam is in its fully tripped position. The linkage is arranged to provide an adjustable stop with the trip beam in its working position, and also provides a stop in its fully tripped position by abutment of existing parts to prevent the beam from tripping too far. The beam will automatically reset after tripping.

The linkage includes an adjustable portion for alignment of the earth working tool being utilized, as well as adjustable spring tension. A wide spacing for the wear points on the pivot pins is provided to minimize wear, and increase rigidity and reliability of the unit.

At the present time moldboard plows in particular have grown to a size where the frame structure of the plow has to be very strong. This usually means a rectangular cross section tubular beam of substantial vertical depth is provided, which beam extends diagonally from the front to the rear of the plow. The mounting of many trip beams to such a main beam is difficult because of the vertical depth. The device of the present invention however, will clamp onto large main beams and will be pivoted at a level directly below and to the rear of the main beam to provide for the maximum clearance possible. In the present device the rest of the linkage can be anchored above the main beam, where it will not interfere with clearance of the plow.

The device, as shown, with normal plow frame clearance will trip upwardly to provide ground clearance of 22 to 24 inches. This exceeds the tripping clearance of most similar plows. The standard that holds the earth working tool is permitted to pivot a substantial number of degrees about the pivot without overstressing the spring by the proper linkage arrangement. This arrangement is arrived at by proper location of the spring anchor or pivot points in relation to the folding linkage, as well as in relation to the pivot of the standard that holds the earth working tool. Holding the total spring expansion during the tripping cycle to a minimum amount allows starting with more spring pressure in working position without overstressing the spring. The spring force can then be used to reset the beam and hold the beam under heavy loads in working position. Very little spring expansion occurs in the top 12 inches of the tripping cycle where the weight of the bottom is sufficient for resetting until the share strikes the ground. At that point, spring leverages and force on the share build up rapidly to reset the bottom to working position.

BRIEF DESCRIPTION OF THE DRAWINGS

FIG. 1 is a side elevational view of a trip beam for an earth working tool made according to the present invention;

DESCRIPTION OF THE PREFERRED EMBODIMENT

Figure 2:
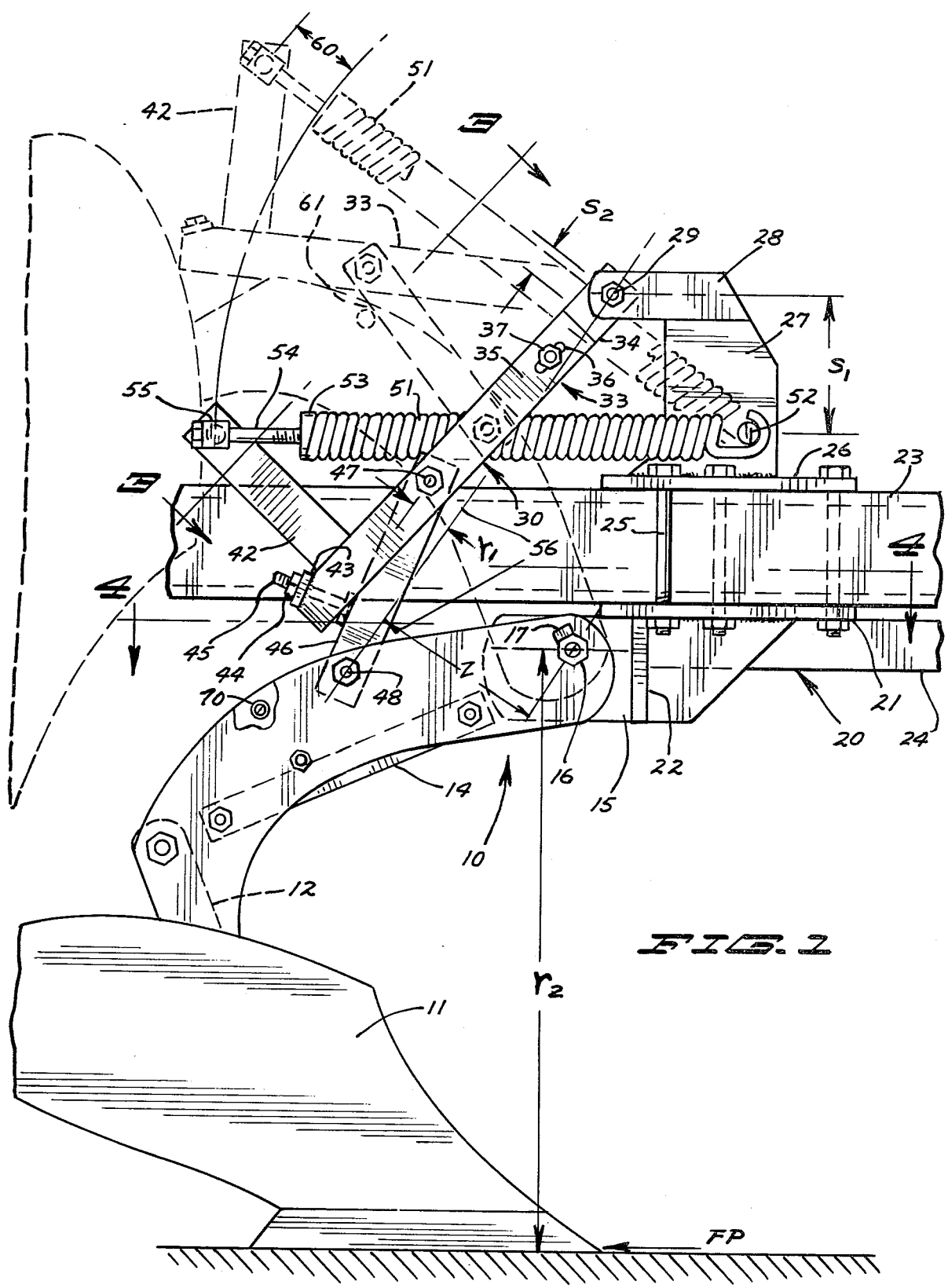
FIG. 2 is a top plan view of the device of FIG. 1.
Figure 2:
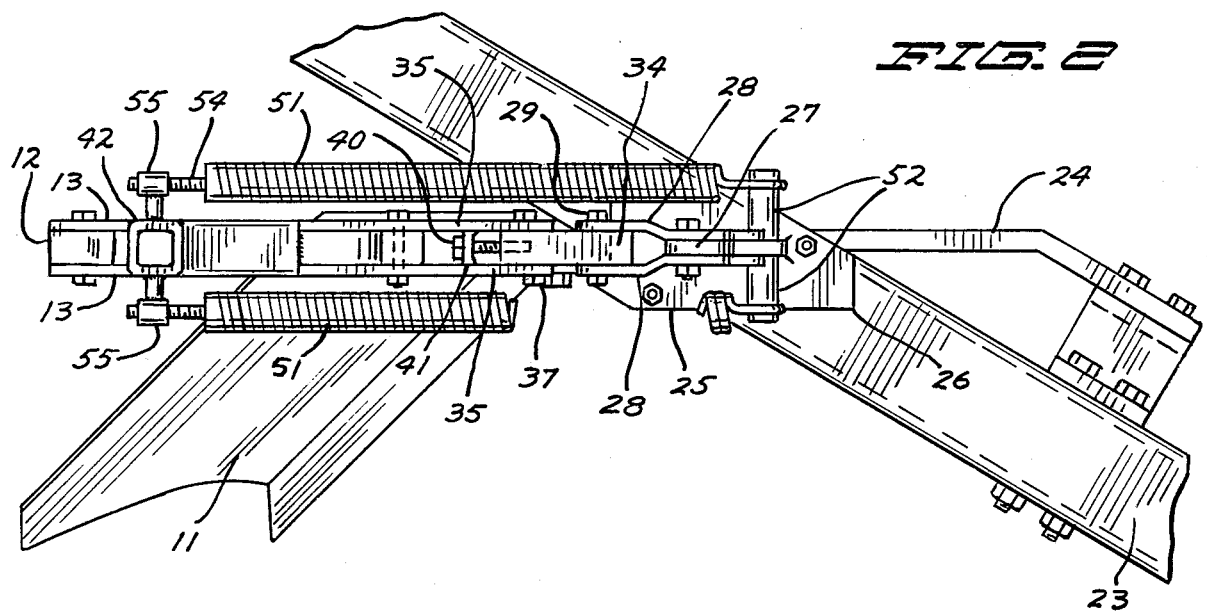

Referring to the drawings, an earth working tool indicated generally at 10 as shown comprises a moldboard plow having a moldboard and share 11 mounted onto a shank 12. The moldboard and share can be of any desired construction, and as shown the shank 12 is positioned between two curved standard plates 13. These standard plates are spaced apart as desired to receive the shank 12, and at the forward edge thereof, above the moldboard and share, spacers 14 are positioned between the standard plates 13. As shown, there are three such spacers, each one-half inch in thickness, so that the bolt openings in the spacers can be punched, rather than drilled, and when used together, the spacers will not only space the standard plates 13 a sufficient distance apart, but will greatly increase the rigidity and strength of the standard plate assembly. The standard plates 13 when bolted to the spacers 14 form an upwardly opening channel shaped section for strength and rigidity. The spacers extend below the curved lower edge of the standard plates for additional strength to resist loads on the moldboard and share.

The forward or upper ends of the standard plates are positioned on opposite sides of a mounting bar 15 with a suitable pivot bolt 16. The pivot bolt 16 has an axis which is the pivot axis of the standard plates. As shown, the head of the pivot bolt is held in position with a small stop member 17 that is welded to one standard plate 13, so that the bolt does not rotate relative to the standard plates, but rather rotates or pivots in the bar 15.

The bar 15 forms one of the main supports for the earth working tool, and is part of a clamp assembly indicated generally at 20. The clamp assembly includes the bar 15 welded to a base plate 21, and a reinforcing lug 22 that extends at right angles to the bar 15. The bar 15 is positioned underneath a transversely and rearwardly extending box section frame support beam 23 that is the main beam of the plow assembly, in the form shown. The frame beam 23 extends diagonally with respect to the direction of travel of the plow. The bar 15 is a heavy bar of width to match the standard plate's spacing. Bar 15 is welded to plate 21. A bar 24 is also welded to the plate 21, and overlaps and is welded to bar 15. The bar 24 extends forwardly of the clamp assembly 20 and is of vertical depth selected so that a standard plow coulter can be clamped onto this bar 24 in the proper position ahead of and for operation in connection with the moldboard and share 11. The coulter mount bar 24 is thus precisely located with respect to the plow bottom with which it is used. The forward end of bar 24 can be attached to other portions of the plow frame. The bar 15 has a large vertical depth to insure an adequate wear surface for the standard 13 which carries the side loading on the moldboard, without excessive wear.

The plate 21 is clamped tightly against the bottom of the box beam 23 and is securely held in relation thereto, by a plurality of bolts, one of which is indicated at 25 and extends on the outside of the box beam, through an upper plate 26 and the lower plate 21. Additional bolts are shown, extending through plate 26 and actually through the box beam itself to hold the clamp assembly 20 in position and secured to the beam 23, and to secure plate 26.

An upright standard or mast 27 is fixedly welded to the plate 26 and extends upwardly therefrom. The standard 27 in turn has a pair of ears 28, 28 extending rearwardly therefrom near the upper end as shown. The ears 28 are provided with aligning apertures that mount a pivot bolt 29 forming a pivot axis. The bolt 29 with a bushing, pivotally holds an upper or first link assembly 33 for a folding link assembly 30. The first link assembly pivots about the axis of the bolt 29 (29 will also be termed the pivot axis) and as shown is made up of a plurality of adjustable parts. The first link assembly 33 includes a first solid bar portion 34 that fits between the ears 28, 28 and extends downwardly and rearwardly. A pair of side plates 35 are positioned on the opposite sides of the bar 34, and are adjustably mounted with respect thereto. These plates 35 have elongated slots 36 therein, through which a clamp bolt 37 passes. The bolt 37 also passes through a provided opening in the bar 34, so that the plates 35 can be clamped against the sides of bar 34 to make the entire first link assembly a rigid member.

Figure 3:
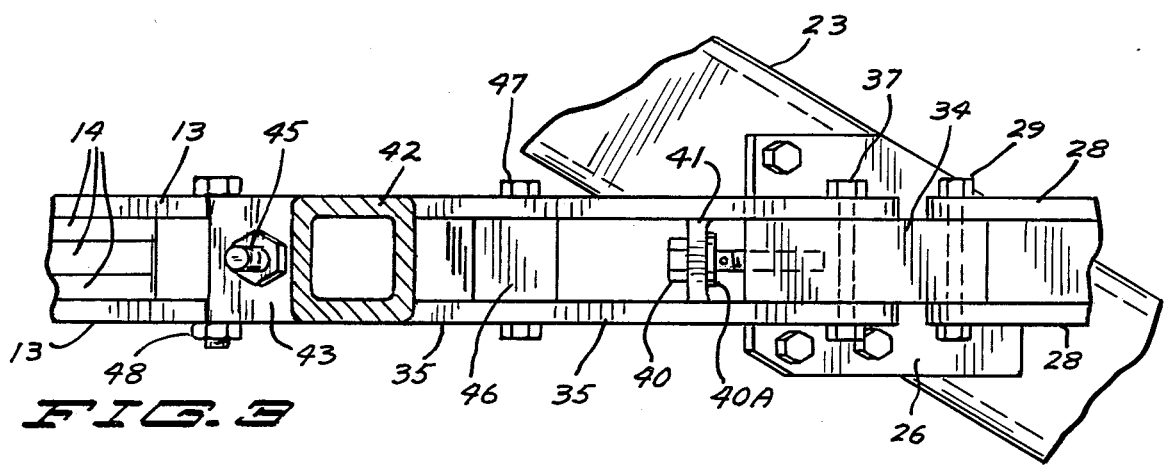
FIG. 3 is an enlarged sectional view taken as on line 3—3 in FIG. 1.
Figure 4:
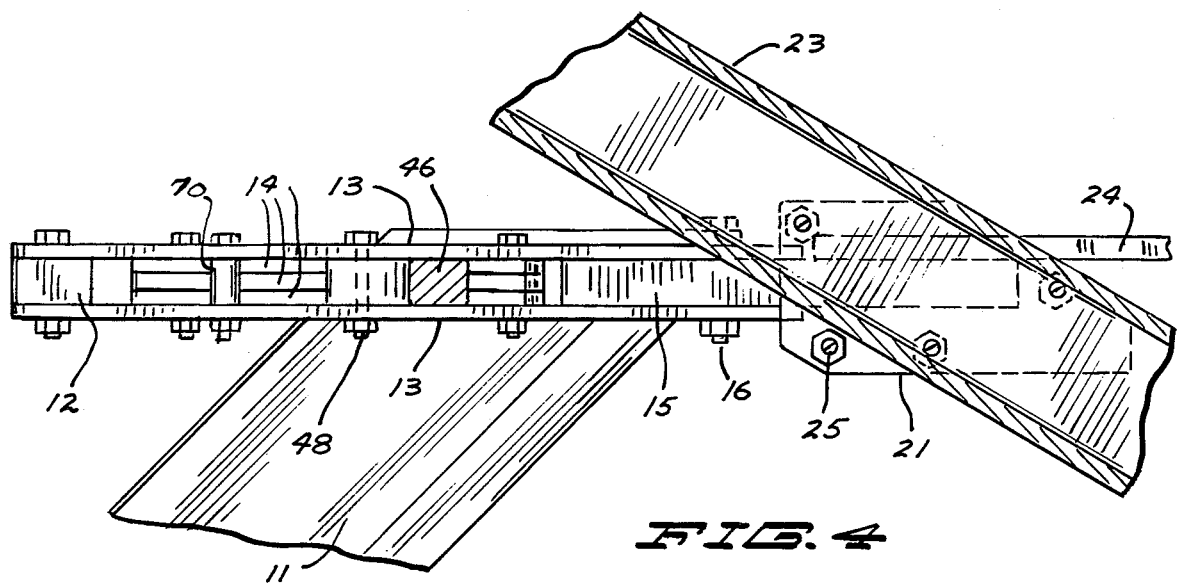
FIG. 4 is an enlarged sectional view taken as on line 4—4 in FIG. 1.

The adjustment of the first link assembly in longitudinal direction is accomplished through the use of an adjusting bolt indicated at 40 which rotatably passes through an opening in a cross member 41 extending between and fixed to plates 35, and which is threaded into a threaded opening in the adjacent end of the bar 34. The plates 35 are spaced sufficiently far apart so that a socket type wrench can be placed on the head of the bolt 40 for adjustment. A backing washer 40A is pinned in position on the bolt 40 on the opposite side of the cross piece 41 from the bolt head (see FIG. 3). The bolt 40 can be threaded into and out of the block 34 to change the position of the legs 35 with respect to the bar 35 after which the clamp bolt 37 can be tightened to securely hold the first link assembly together.

The bars 35 are extended rearwardly and downwardly, and adjacent the lower end of the first link assembly an upright mast 42 is securely attached to bars 35 and extends upwardly and rearwardly therefrom. A short cross piece 43 is also welded to both bars 35 at the outer end thereof to the rear of mast 42, and the cross piece is drilled and threaded. A stop bolt 45 is threaded through the cross piece for adjusting the linkage and a lock nut 44 may be used to hold the stop bolt securely. The cross piece 43 is angled slightly as shown.

A second link forming a portion of the folding link assembly 30 is indicated at 46, and this second link is pivotally mounted about the axis of a pivot bolt 47 to the midportions of the first link assembly 33. The second link 46 fits between the plates 35. The second link 46 also extends downwardly and rearwardly and is pivotally mounted between the standard plates 13 with a pivot bolt 48 that passes through the standard plates and the link 46, so that the unit is securely held. The link 46 is a solid bar of high carbon steel, and is drilled for bushings for the bolts 47 and 48 to avoid wear. Likewise, the solid bar 34 is drilled for a bushing for the pivot bolt 29, so that the pivoting points on the linkage are well protected against excessive wear. If the bushings in bar 46 wear, or if the bar itself wears, replacement is easy and the parts are low cost.

As shown, the stop bolt 45 which extends from plate 43 will abut against the upper surface of the second link 46 as the linkage folds toward a straight line, to prevent the second link 46 from moving past a desired position. This stop prevents the pivot axis of bolt 47 from going over-center with respect to a plane passing through the axes of bolts 29 and 48. As can be seen, the axis of bolt 47 is a substantial distance ($r_1$) from this plane which is indicated at 56, in the adjusted position as shown.

The folding linkage assembly 30 is controlled in its relative positions in part by bias means comprising a pair of parallel acting tension springs 51, which are mounted at first ends to a cross pin 52 that in turn is mounted to the standard member 27, and the tension springs in turn have threaded blocks 53 at the opposite ends thereof carrying bolts 54 that are rotatably mounted through pivoting blocks 55 which in turn are pivotally mounted onto the mast 42 near the upper end of the mast.

The bolts 54 can be adjusted to exert a desired pretension from the springs on the folding linkage 30, and this force will tend to urge the center pivot bolt 47 toward the plane 56 defined by the axes of pivot bolts 29 and 48, and in turn will force the standard plates 13 to pivot about the axis of main bolt 16 to force the moldboard and share 11 toward its working position. The stop bolt 45 adjusts the linkage position when it is in its working position.

The adjustment bolt 40 that is used for adjusting the length of the upper link assembly 33 in effect is an adjustment that is used for aligning the moldboard and share properly with relation to the ground so that the point of the share is not tilted or cocked when the folding linkage and the moldboard are in their working position. It should also be noted that the axis of the bolt 47 is spaced a substantial distance from the reference plane 56 which means that the linkage does not tend to "lock up" or change greatly in the force required to cause it to fold with a very short difference in position of bolt 47.

The springs 51 are set with sufficient tension so that the moldboard and share are held in working position against the force indicated by $F_p$ at the lower end of the share. This force $F_p$ acts about a lever equal to the distance from the axis of bolt 16 down to the lower edge of the share (indicated at $r_2$), and of course the springs must be able to resist force $F_p$ acting on the linkage through the effective lever arm indicated at $r_1$ between the axis of bolt 47 and plane 56. The distance from the axis of bolt 16 to plane 56 is indicated at Z.

If the moldboard and share 11 strikes a rock or stump or similar object, where the force $F_p$ increases substantially, this force will tend to pivot the standard plates about bolt 17 creating a force acting through the link 46 through lever arm $r_1$ to tend to cause the first link assembly 33 to pivot upwardly about the axis of bolt 29. The resistance from the springs 51 initially acts along a line passing through the center line of the springs, that is the line through the center of the pin 52 and the center of the block 55, and the radius of action is equal to the perpendicular distance from this line to the axis of the bolt 29. Such a lever arm for spring action in the initial stages is illustrated generally at $S_1$ in FIG. 1. Assuming that the force $F_p$ increases so that the springs 51 will yieldably permit folding of the linkage 30, the moldboard will then start to pivot about the axis of bolt 16, and the first and second links 33 and 46 will fold as they move about the pivot axes of bolts 47, 48 and 29.

The mast 42 will be carried upwardly by the outer end of the first link assembly 33. The moldboard will pivot to its position as shown in dotted lines in FIG. 1. In this position, it can be seen that a high amount of clearance has been achieved, with the point of the share not significantly below the mounting bar 15 and in actual practice this clearance from the ground to the lower end of the plow share when tripped has been in the range of 22 to 24 inches. Additionally, it can be seen that the effective lever arm of the springs 51 has reduced substantially. The springs are mounted so the lever arm does reduce as the moldboard pivots (there is less force needed as the moldboard pivots up) so that the center line of the springs and the axis of bolt 29 actually approach a near center position. For example, in the form shown in FIG. 1 this lever arm $S_2$ is illustrated as being quite short. This means that the amount of force tending to hold the moldboard and share upwardly is reduced. The weight of the moldboard and share will cause the assembly to return to working position as soon as the share clears the obstruction.

It is not necessary (nor is it desirable) to exert high spring pressure on the share after it clears the ground. Thus, the reduced effective spring lever as the moldboard trips is a great benefit in the present invention. Further, it should be noted that because of the relationship of the pivot of the springs on pin 52 in relation to the pivots of bolts 29 and 16, the amount of spring extension is significantly lowered from any other known arrangement using a folding linkage. This spring expansion is illustrated at 60 in FIG. 1. When spring expansion is kept low the use of tension springs becomes feasible. Over-stressing is avoided and the effective required length of the spring can be reduced as well reducing the other physical sizes of the spring. In the form shown, about 4¼ inches of spring expansion permits tripping the moldboard fully, that is 22-24 inches of clearance with the springs shown. This low expansion permits using initial expansion of about 3¾ inches for initial holding force, without overstressing the springs.

When the moldboard is in its fully tripped position, it can be stopped at this high raised position by mechanical abutment of a spacer 70 held between standard plates 13 by a bolt. As shown at 61 the second link 46 will abut against the spacer 70 to provide a positive stop when the earth working tool reaches a fully tripped position.

The springs 51 still will be exerting some force tending to force the fully tripped moldboard downward, but the weight of the moldboard and share acting on the linkage is sufficient to cause the share to return toward the ground position. As the share moves closer and closer to the working position the effective lever arm of the springs increases again, and this spring force then tends to snap the share back into its working position. The springs 51 can be quite high in initial tension to exert a high initial holding force because of the limited amount of spring expansion required during the full tripping action. This means that there is less reliance on a "overcenter" action of the linkage and more reliance on spring force, which is much more reliable and controllable and the holding force is less likely to be affected substantially because of small amounts of wearing, friction, lubrication, etc. The adjustment bolt 54 provides for a wide range of adjustment in spring tension so that the moldboard and share can be used in a wide variety of different types of soils, and the adjustment bolt 45 can be used for varying the effective action radius $r_1$ of the lower link tending to trip the upper link.

It is a feature of the invention that the pivot of springs 51 on pin 52 is positioned only a short distance ahead of the plane defined by the bolts 29 and 16, so that the major portions of the springs overlie the moldboard and share and the standard plates 13, and the fore and aft distance required for the earth working tool can be used for providing a satisfactory length of spring. The springs can be attached to the same bracket as the upper link pivot for stability. The abutment of link 46 and the spacer 70 held between standard plates 13, as indicated at 61, aids in preventing the moldboard from tripping so far that the springs go overcenter and the moldboard remains tripped. Further, the positioning of the upper link pivot on the same standard as that which holds the springs saves weight, and reduces costs as well as making the clamp assembly easier to install. The axis of pivot bolt 16 of course is positioned to the rear of the beam 23, so that as the standards 13 pivot they do not strike the beam 23. The stop action shown at 61 also aids in preventing the standards 13 from hitting the beam 23 when tripped.

Further, raising the attaching points of the spring above the main beam and extending the rear attaching point rearwardly by use of mast 42 insures that an adequate length of spring can be obtained without extending the spring excessively far forwardly to where it would tend to go overcenter with respect to the axis of bolt 29 as the unit trips, and permits the positioning of the spring in a substantially horizontal position. As shown, that permits the effective radius of force action $s_1$ of the spring to start to diminish quickly, and keeps the spring up out of trash and other foreign materials that might tend to catch on the spring. There is no need to have a heavy spring mount far forwardly of the clamp that is used as the main mount for the trip beam. Thus, weight is saved and a compact trip beam is obtained. Also, the plow has a lower profile than linkages using the large compression type spring.

As shown, pin 52 is about the same distance ahead of bolt 29 as it is below the bolt. A line through the center of bolt 29 and pin 52 is thus about 45° to the horizontal and the arrangement provides secure spring mounting and the spring does not go past the axis of bolt 29 as the unit trips.

What is claimed is:

1. A tripping beam for an earth working tool including a generally horizontal beam frame member extending fore and aft and diagonally with respect to the direction of travel of said tool, said frame member having a substantial vertical depth, and means to mount a pivoting trip beam to said frame member including a first support fixed to the lower side of said frame member and including means forming a first pivot immediately below and to the rear of said frame member, an earth working tool including a standard pivotally mounted about said first pivot and extending rearwardly and downwardly therefrom, a second support mounted to and positioned above said frame member, said second support including a mast extending upwardly from said frame member, a folding linkage including first and second links, a pivot connection pivotally mounting said first and second links together at first portions thereof, said first link having a second portion pivotally mounted to said second support and said second link having a second portion pivotally mounted to said earth working tool rearwardly of the frame member and said first pivot, said folding linkage extending rearwardly and downwardly from the pivotal mounting of said second portion of said first link to said second support to said earth working tool, and tension spring means having a first end mounted to said second support for pivotal movement about an axis above said frame member and below the pivotal mounting of the first link to the second support, and means to mount a second end of said tension spring means to said first link at a level above the lower edge of said frame member, said means to mount said second end of said tension spring means positioning the second end of said spring means rearwardly of the pivot between said first and second links and urging the pivot between said first and second links forwardly, the pivot between said first and second links remaining spaced rearwardly and above a plane defined by the axes of the pivotal mountings of said second portions of said first and second links, respectively, when the earth working tool is in a working position, the points of mounting of the tension spring means separating to elongate said tension spring means as the earth working tool moves from working position.

2. The combination as specified in claim 1 wherein said means to mount said second end of said spring means comprises a portion of said first link which extends beyond the pivot between said first portions of said first and second links, and including means fixed to said first link which raises the attachment point of the second end of said spring means to a position where said spring means is substantially horizontal with the earth working tool in working position.

3. The combination as specified in claim 1 and stop means acting between said first and second links to prevent the pivot between said first and second links from moving closer to said plane under urging of said spring means more than a preselected distance.

4. The combination as specified in claim 1 wherein said folding linkage is mounted so that the pivot between said first and second links moves generally upwardly as said earth working tool moves about its mounting pivot, and said second end of said spring means is carried upwardly by said means mounting said second end of said spring means to said first link to a position wherein the center plane of said spring means between its first and second ends approaches the axis of the pivot of the second end of said first link to said second support when the earth working tool reaches a fully tripped position.

5. The combination of claim 1 wherein said earth working tool pivot is located in respect to the folding linkage to pivot in the range of 75° from its working position to its fully tripped position.

6. The combination as sepcified in claim 1 wherein said earth working tool comprises a moldboard and share of a plow and wherein said first support comprises a first plate and said means forming said first pivot for said earth working tool comprises a first bar member of substantial thickness having one edge fixed to said first plate and extending downwardly therefrom, said pivot being formed by an aperture extending through said first bar member to provide substantial length for the pivot axis of said pivot, said first bar member having a wear surface facing in the direction that the moldboard moves material when plowing, said means to mount the earth working tool having a surface mating said wear surface to support the twisting load from the moldboard.

7. The combination as specified in claim 6 and a second bar member fixed to said first bar member and said plate and extending forwardly of said frame in direction parallel to the direction of normal travel of the moldboard and being of size to receive and mount a coulter for use with said moldboard.

8. The combination of claim 1 wherein said first link is adjustable in length and comprises a bar forming a first section, and a second section having a wall which telescopes along the bar, a cross piece fixed to said wall and spaced from said bar, a threaded member rotatably mounted through said cross piece and threaded into the adjacent end of said bar and being retained from axial movement with respect to said cross piece to permit threadably adjusting the relative positions of said bar and cross piece, and means to separately releasably clamp said wall and bar together.

9. The combination of claim 1 wherein said earth working tool is supported with respect to said first pivot by a pair of spaced standard plate members, said second link being positioned between said spaced standard plate members.

10. The combination of claim 9 wherein said first link comprises a pair of strap members, and said second link fits between said strap members and is pivotally mounted thereto, said standard plates extending rearwardly of the pivot thereof to the second link, a spacer attached to said standard plates adjacent the upper portion thereof and to the rear of the pivot between the standard plates and the second link whereby said second link and the spacer abut to form a stop when the earth working tool reaches a fully tripped position.

11. A trip mechanism for an earth working tool such as a moldboard plow having a frame member, a standard carrying said earth working tool, first means to pivotally mount said standard to said frame at a first pivot axis below the level of the lower edge of said frame member, a folding linkage including a first link pivotally mounted with respect to said frame at a second pivot axis positioned spaced above said first pivot and adjacent a vertical plane passing through said first pivot, and a second link having a first end pivotally mounted to said first link at a third pivot axis and a second end pivotally mounted to said standard at a fourth pivot axis, said fourth pivot axis being spaced rearwardly from said first pivot axis, said earth working tool being movable to a working position wherein the third pivot axis approaches but remains spaced from a plane defined by the second pivot axis and the fourth pivot axis, a tension spring means having a first end mounted for pivotal movement with respect to said frame, and means to mount a second end of said spring means to said first link, said means to mount a second end of said spring means including a portion of said first link which extends a substantial distance from said last mentioned plane on a side thereof opposite from the mounting of the first end of said spring means, and said spring means being at a level positioned above both the first and fourth pivot axes and below the second pivot axis, the mounting of the first end of the spring means being ahead of a second plane defined by the first and second pivot axes, whereby as said earth working tool pivots away from its earth working position about said first pivot axis in an upwardly direction, said links will fold relative to each other about the third pivot axis and said tension spring means is carried by said first link and elastically elongates, and wherein said spring means initially elongates a substantially greater amount for each degree of pivoting of said earth working tool than the amount it elongates per degree of pivoting of the earth working tool as the earth working tool moves farther away from its working position.

12. The combination of claim 11 wherein said first link extends beyond the third pivot and overlies the second link, said portion of said first link including a mast extending upwardly from said first link.

13. The combination of claim 12 and an adjustable stop member mounted on the first link at the portion which overlies said second link, said adjustable stop engaging the second link when the earth working tool is in working position.

14. The combination as specified in claim 11 wherein said first end of said spring means is mounted to said frame to pivot at a point above said frame member and substantially equal distances below and ahead of said second pivot.

15. The combination of claim 14 and means to stop pivoting of said standard about said first axis when the standard has pivoted to a fully tripped position of said earth working tool, said fully tripped position occurring before the effective force line of said spring means intersects the axis of said second pivot.

* * * * *